United States Patent
Eastty et al.

(10) Patent No.: US 7,443,385 B2
(45) Date of Patent: Oct. 28, 2008

(54) DATA PROCESSING

(75) Inventors: Peter Charles Eastty, Eynsham (GB);
Peter Damien Thorpe, Oxon (GB);
Christopher Sleight, Chipping Norton (GB)

(73) Assignee: Sony United Kingdom Limited, England (GB)

( * ) Notice: Subject to any disclaimer, the term of this patent is extended or adjusted under 35 U.S.C. 154(b) by 0 days.

(21) Appl. No.: 10/925,241

(22) Filed: Aug. 24, 2004

(65) Prior Publication Data

US 2005/0024345 A1    Feb. 3, 2005

Related U.S. Application Data

(63) Continuation of application No. 09/898,548, filed on Jul. 3, 2001, now abandoned, which is a continuation of application No. 09/177,401, filed on Oct. 23, 1998, now abandoned.

(30) Foreign Application Priority Data

Oct. 24, 1997    (GB)    .................. 9722541.1

(51) Int. Cl.
G09G 5/00    (2006.01)
G06F 3/00    (2006.01)
G06F 3/048   (2006.01)

(52) U.S. Cl. .................. 345/173; 345/1.3; 345/174; 178/18.01; 178/18.06; 715/716; 715/764; 715/772; 715/798

(58) Field of Classification Search .................. 345/180, 345/181, 170, 172–175; 715/824, 716, 726, 715/732, 764, 772, 798, 800; 178/18.01–18.07
See application file for complete search history.

(56) References Cited

U.S. PATENT DOCUMENTS

| | | | |
|---|---|---|---|
| 4,631,525 A | 12/1986 | Serravalle, Jr. | |
| 4,855,725 A | 8/1989 | Fernandez | |
| 4,899,138 A * | 2/1990 | Araki et al. | .................. 345/175 |
| 5,053,758 A | 10/1991 | Cornett et al. | |
| 5,103,085 A * | 4/1992 | Zimmerman | .................. 250/221 |
| 5,437,552 A | 8/1995 | Baer et al. | |
| 5,475,399 A | 12/1995 | Borsuk | |
| 5,523,774 A | 6/1996 | Schwartz | |
| 5,559,301 A * | 9/1996 | Bryan et al. | .................. 84/653 |
| 5,788,851 A * | 8/1998 | Kenley et al. | .................. 210/739 |
| 6,028,600 A * | 2/2000 | Rosin et al. | .................. 715/718 |
| 6,054,990 A | 4/2000 | Tran | |
| 6,078,308 A | 6/2000 | Rosenberg et al. | |
| 6,094,197 A | 7/2000 | Buxton et al. | |
| 6,121,959 A | 9/2000 | Fukumoto et al. | |

FOREIGN PATENT DOCUMENTS

| | | |
|---|---|---|
| EP | 0 689 122 | 12/1995 |
| WO | WO 97 18508 | 5/1997 |

* cited by examiner

*Primary Examiner*—Henry N Tran
(74) *Attorney, Agent, or Firm*—Frommer Lawrence & Haug LLP; William S. Frommer; Thomas F. Presson

(57) ABSTRACT

Data processing apparatus comprises an array of user-operable controls, the controls being adjustable by movement of a user's hand while touching a control; a detector for detecting when a user's hand is touching a control; a display screen for displaying respective screen icons associated with the controls; and a display processor, responsive to a detection that a user's hand is touching one of the controls, for altering the screen icon associated with that control.

4 Claims, 10 Drawing Sheets

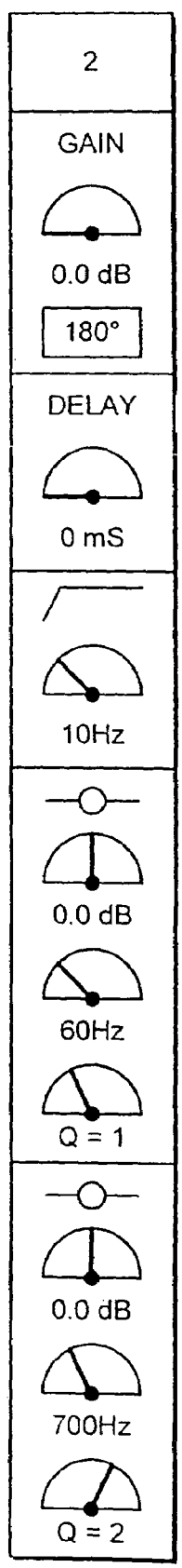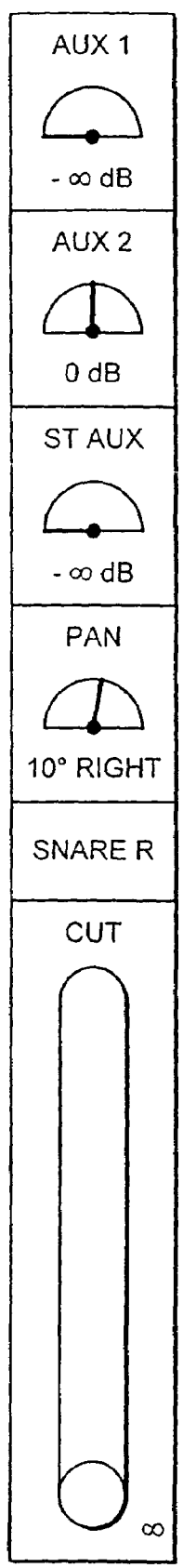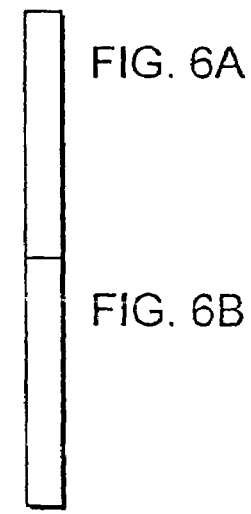
FIG. 6A
FIG. 6B

| | R | G | B |
|---|---|---|---|
| 0 | 17 | 223 | 56 |
| 1 | 60 | 60 | 60 |
| ... | | | |
| 255 | 255 | 200 | 0 |

DATA PROCESSING

This is a Continuation of application Ser. No. 09/898,548 filed Jul. 3, 2001 now abandoned, which is a Continuation of application Ser. No. 09/177,401 filed Oct. 23, 1998, which is now abandoned.

BACKGROUND OF THE INVENTION

1. Field of the Invention

This invention relates to data processing.

2. Description of the Prior Art

Data processing apparatus including display screens (e.g. PC computers) are generally controlled by external control devices such as keyboards, mice etc.

If the user wishes to concentrate on data displayed on the screen, it is difficult to look at the control devices while the user is operating such devices.

One solution is to make the control devices in a predetermined configuration, such as that used for standard "QWERTY" keyboards. This then allows touch typing to be learned. However, learning the layout of a complicated control device can be time-consuming and difficult.

SUMMARY OF THE INVENTION

This invention provides data processing apparatus comprising:

an array of user-operable controls, the controls being adjustable by movement of a user's hand while touching a control;

a detector for detecting when a user's hand is touching a control;

a display screen for displaying respective screen icons associated with the controls; and a display processor, responsive to a detection that a user's hand is touching one of the controls, for altering the screen icon associated with that control.

The invention allows the user to operate a potentially complicated array of controls without the need to learn the control layout by heart (which may be impossible in some applications) or to look at the controls while he is operating them. The controls are adjustable by movement once the user is touching the controls, so the invention indicates to the user as soon as he touches a control in order that the user can check that he is touching the correct control before initiating an adjustment.

BRIEF DESCRIPTION OF THE DRAWINGS

The above and other objects, features and advantages of the invention will be apparent from the following detailed description of illustrative embodiments which is to be read in connection with the accompanying drawings, in which:

FIGS. 6A and 6B schematically illustrate a channel strip;

DESCRIPTION OF THE PREFERRED EMBODIMENTS

Figure 1:
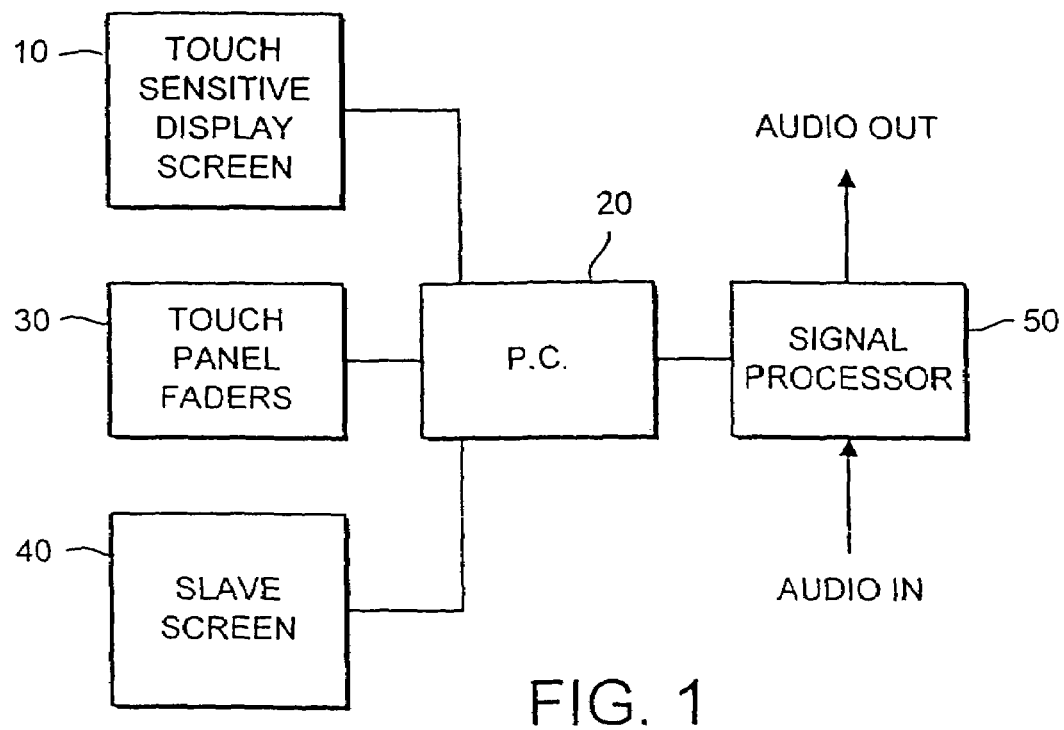
FIG. 1 schematically illustrates an audio mixing console.

FIG. 1 schematically illustrates an audio mixing console comprising a touch-sensitive display screen 10, a control computer 20, a touch-fader panel 30, a slave display screen 40 and a signal processor 50.

The basic operation of the audio mixing console is that the signal processor 50 receives audio signals, in analogue or digital form, and processes them according to parameters supplied by the control computer 20. The user can adjust the parameters generated by the control computer 20 either by touching the display screen 10 or by operating the touch panel faders 30. Both of these modes of parameter adjustment will be described in detail below.

The slave screen 40 is provided to display various metering information such as audio signals levels at different points within the mixing console.

Figure 2:
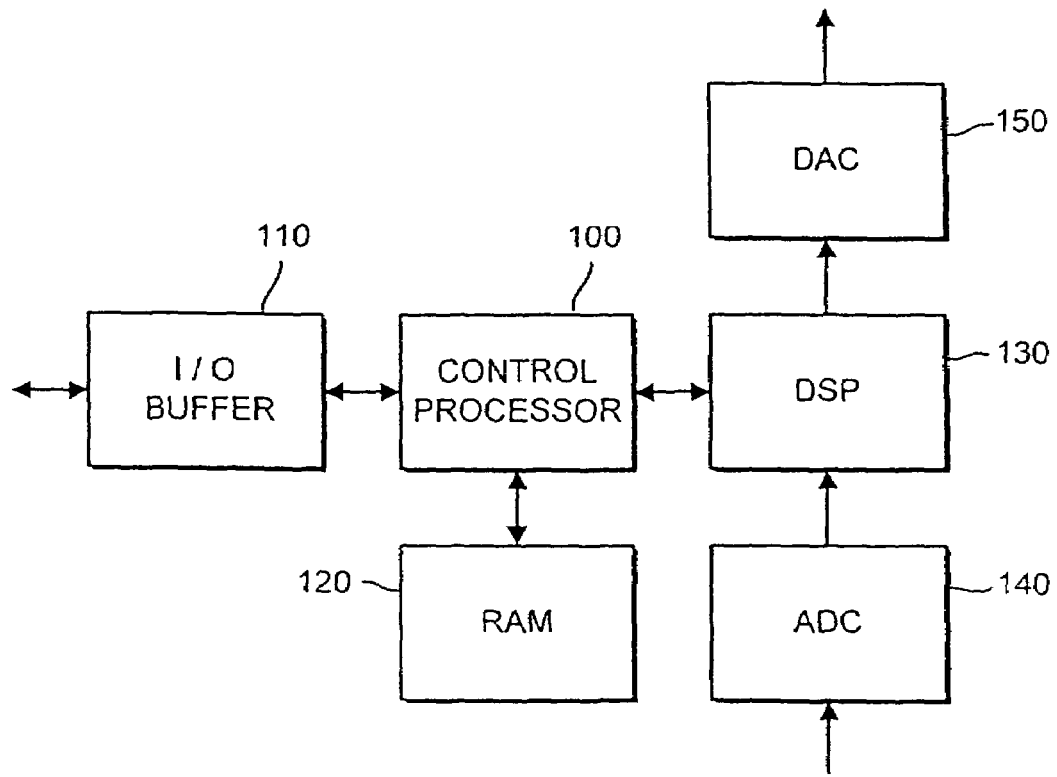
FIG. 2 schematically illustrates a digital signal processor forming part of the audio mixing console of FIG. 1.

FIG. 2 schematically illustrates the digital signal processor 50. The digital signal processor 50 comprises a control processor 100 for controlling data and filter coefficient flow within the digital signal processor 50, an input/output (I/O) buffer 110 for receiving parameter information and filter coefficients from the control computer 20 and for returning metering information back to the control computer 20, a random access memory (RAM) 120 for storing current parameter data, a programmable DSP unit 130, an input analogue-to-digital converter 140 for converting input analogue audio signals into digital audio signals (where required) and an output digital-to-analogue converter 150 for converting digital audio signals into output analogue audio signals (where required).

Figure 3:
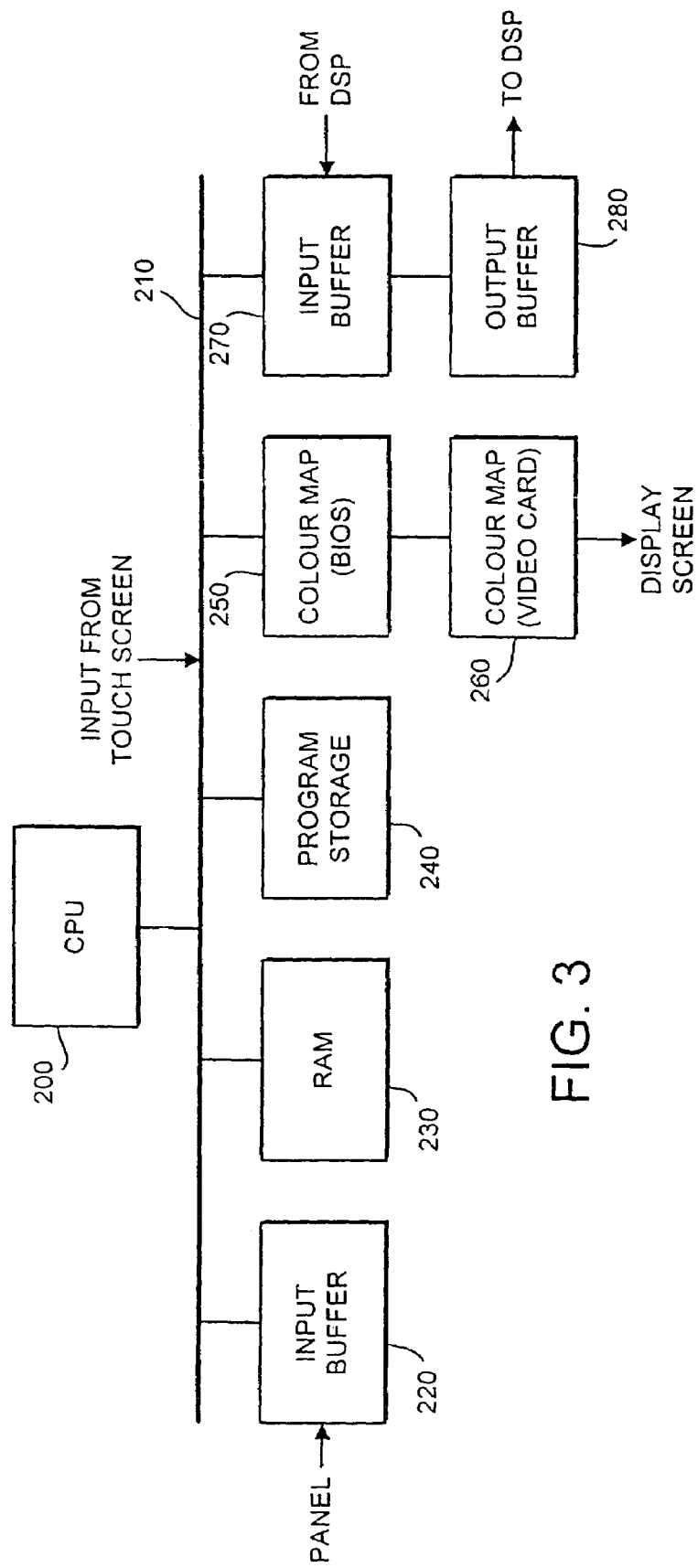
FIG. 3 schematically illustrates a control computer forming part of the audio mixing console of FIG. 1.

FIG. 3 schematically illustrates the structure of the control computer 20. The control computer 20 comprises a central processor 200 connected to a communications bus 210. Also connected to the communications bus are: an input buffer 220 for receiving data from the fader panel 30, a random access memory (RAM) 230, program storage memory 240, a BIOS colour map 250, a video card 260 including a video card colour map, an input buffer 270 for receiving data from the digital signal processor 50 and an output buffer 280 for transmitting data to the digital signal processor 50.

Figure 4:
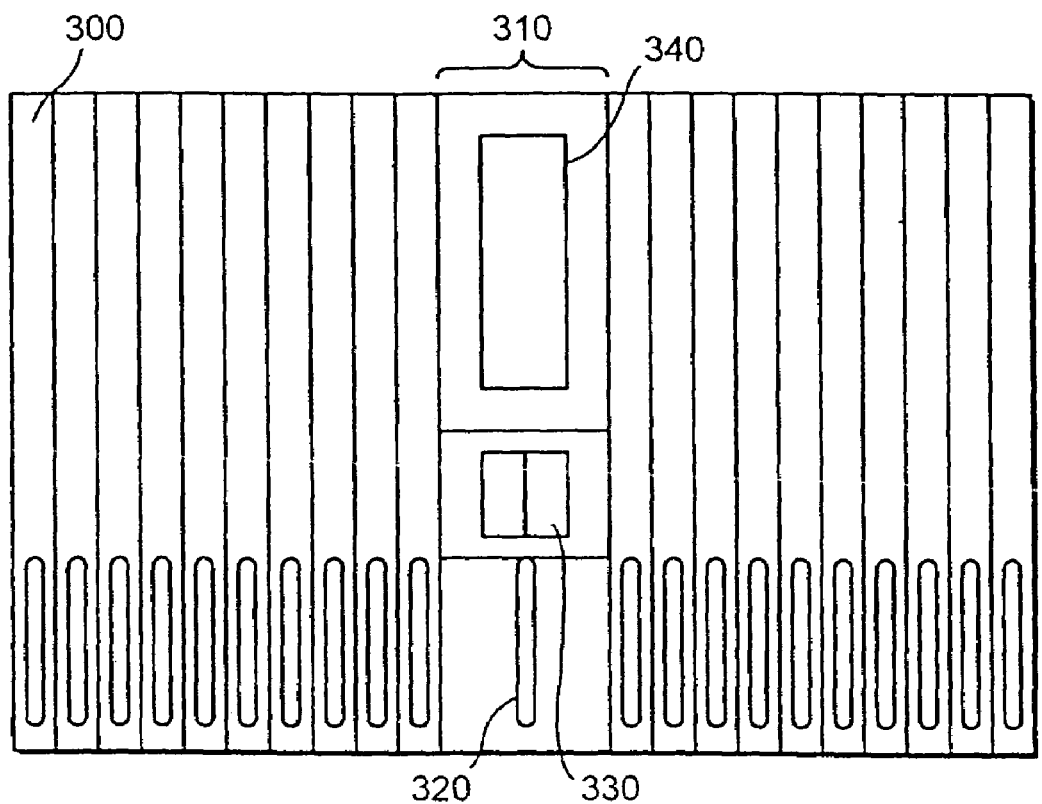
FIG. 4 schematically illustrates the display on a display screen forming part of the audio mixing console of FIG. 1.

FIG. 4 schematically illustrates the display on the touch-sensitive display screen 10.

Running vertically on each side of the display are two groups of ten channel strips 300, laid out in an arrangement similar to the physical layout of a conventional (hardware) audio mixing console. Each channel strip is identical to the others (apart from adjustments which are made by the user to the various parameters defined thereby) and the channel strips will be described with reference to FIGS. 6A and 6B below.

In a central part of the display 310 is provided a main fader 320, routing and equalisation controls 330 and display meters 340.

The channel strips include controls which are adjustable by the user, along with visual indications of the current state of the controls (rather like a hardware rotary potentiometer is adjustable by the user, with its current rotary position giving visual feedback of the current state of adjustment). This feature will be shown in more detail in FIGS. 6A and 6B. Accordingly, as a parameter is adjusted by the user, the control computer 20 makes corresponding changes to the displayed value on the display screen 10, and also generates a replacement set of filter or control coefficients to control the corresponding processing operation carried out by the signal processor 50.

The meters 340 provide simple level indications for, for example, left and right channels output by the DSP 130. (In the case, the level information is transmitted from the DSP 130, via the control processor 100 and the I/O buffer 110, to the input buffer 270 of the control computer.)

Figure 5:
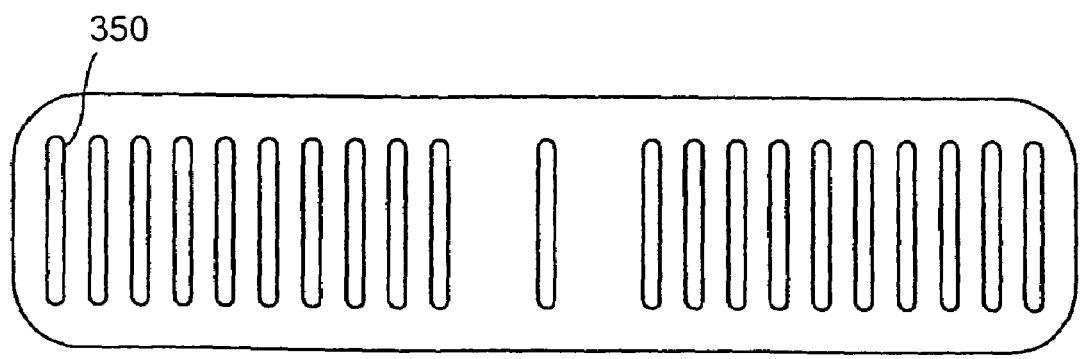
FIG. 5 schematically illustrates a fader panel forming part of the audio mixing console of FIG. 1.

FIG. 5 schematically illustrates the fader panel 30.

The fader panel 30 is primarily a substantially linear array of elongate touch-sensors. The touch-sensors will be described in more detail below, but briefly they are arranged to output three pieces of information to the control computer:

(a) whether the sensor is touched at any position along its length;

(b) the position along the length of the fader at which it is touched;

(c) a signal indicating the proximity of a user's hand to the sensor.

Suitable sensors are described in WO 95/31817.

The fader panel comprises one such sensor 350 for each channel strip on the display screen, plus an extra sensor corresponding to the main fader control 320 on the display screen.

The current level or state of a parameter control is thus shown on the screen. The touch-screen and fader touch-sensors can be used to adjust that current level in either direction, but this is only a relative adjustment form the current level. In other words, a particular finger position on a fader touch-sensor is not mapped to a particular gain value for the corresponding channel, but instead finger movements on a touch-sensor are mapped to adjustments up or down in the gain value.

So, when an adjustment is to be made via the fader panel, the user touches the appropriate fader touch-sensor (for the particular channel or the main fader to be adjusted). The user then moves his finger up or down that touch-sensor. Whatever linear position along the sensor the user's finger starts at, the adjustment is made with respect to the current level of the gain control represented by that fader.

FIGS. 6A and 6B taken together illustrate a channel strip.

The channel strip is a schematic illustration on the display screen of a number of audio processing controls and devices which can be placed in the signal processing path for each of the channels. From the top of FIG. 6A, there is an input pre-amplifier, a variable delay control, a high-pass filter, two band-splitting filters, three controls relating to output feeds from the channel, a so-called panpot, a channel label, and a channel fader. For all of the controls shown in FIG. 6A, i.e. those which process different attributes of the audio signal, the controls can be displayed either in bold or faint colour on the display screen. Where a control is displayed in bold colour, this indicates that the control is "in circuit". Where a control is displayed in faint colour (so-called "greyed out"), the control can still be adjusted but it is not currently in the audio circuit.

As an example of the "greying out" feature, consider the "delay" control at the second-to-top control position in the channels strip (FIG. 6A). The delay can be set to values between, say, 0 milliseconds (mS) and 1000 mS whether or not the delay processor is in the audio circuit, but the delay period is applied to the audio signal only if the delay processor is in circuit.

The channel strip of FIGS. 6A and 6B also illustrates how a visual feedback of a current control setting is given to the user. All of the controls except for the channel fader have an associated numerical value giving their current setting (e.g. 60 Hz for a filter centre frequency, 0.0 dB for a gain), as well as a semicircle with a pointer schematically illustrating the current setting with respect to the available range of settings in a manner similar to the hand of a clock from a lowest possible value (pointer horizontal and to the left) to a highest possible value (pointer horizontal and to the right). So, for the centre frequency of upper the band splitting filter in FIG. 6A, the pointer is a third of the way around the semicircle, indicating that the current value of 60 Hz is nearer to the lower extreme than to the higher extreme. The scales used to map current settings to rotary positions on the semicircles need not be linear, but could be logarithmic or otherwise.

Figure 7:
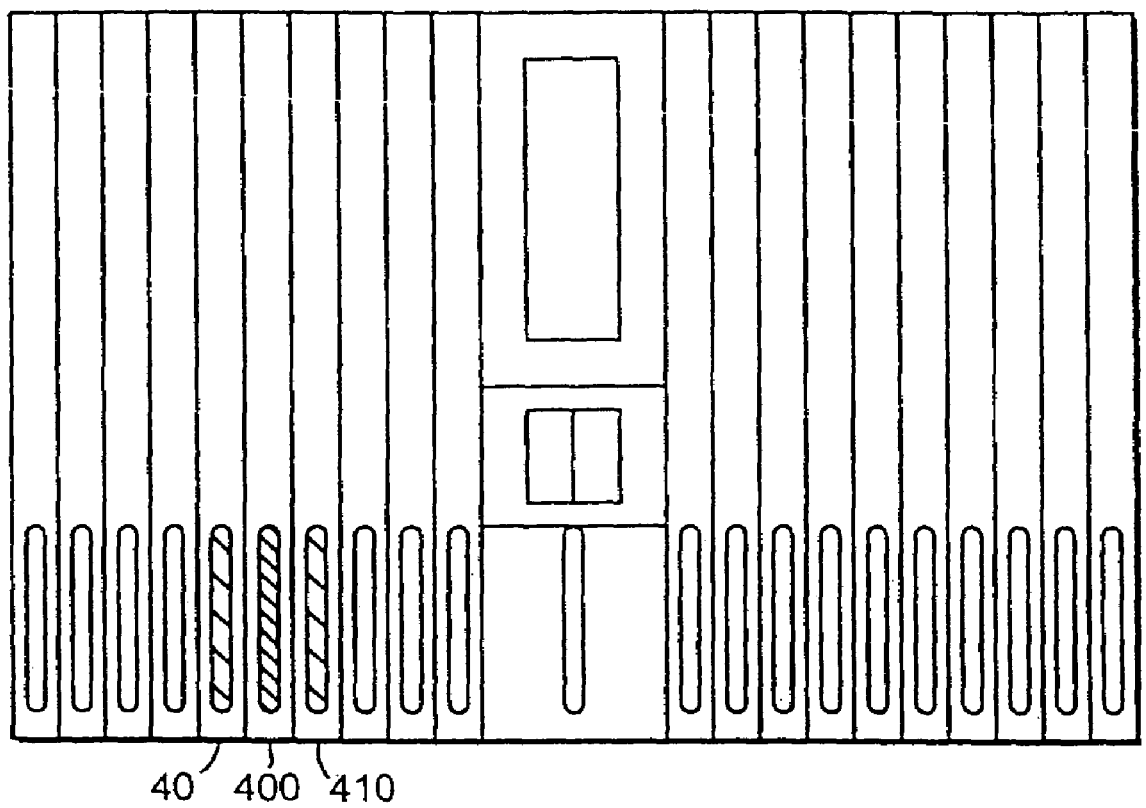
FIG. 7 schematically illustrates a proximity and touch display.

FIG. 7 schematically illustrates the way in which proximity and touch is displayed on the display screen with regard to the faders.

When one of the sensors on the fader panel 30 is touched, the corresponding fader display on the display screen (in this example, a particular fader 400) is coloured in a contrasting colour to the rest of the screen—e.g. red. This shows that that particular fader is currently being touched and so is open to adjustment.

Similarly, when the user's hand is near to one of the faders (as detected by the proximity detector—see above), that fader is coloured in one of several shades of a further contrasting colour, for example getting more saturated as the user's hand gets closer to that fader touch-sensor. Examples are shown as faders 410 in FIG. 7.

This system allows the user to track his hands across the fader panel 30 without having to look down at the fader panel itself, since he can see the proximity of his hands to different faders on the screen. Furthermore, because several degrees of proximity are available for display, it is possible to work out the location of the user's hand from the distribution of the different colours representing different degrees of proximity.

Figure 8B:
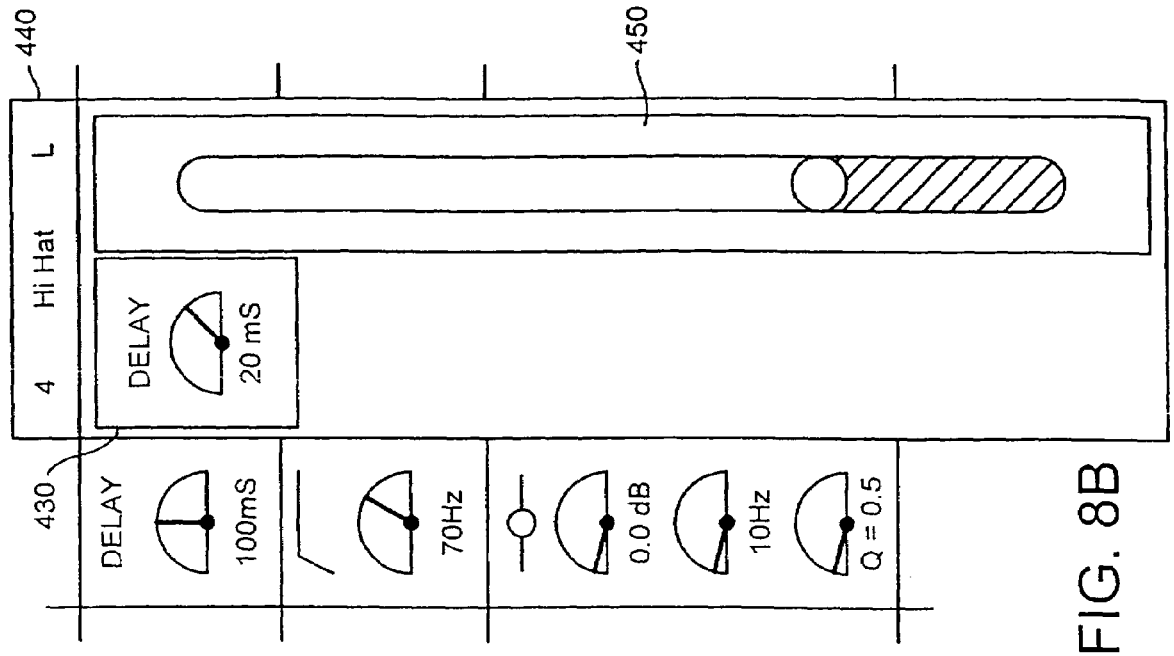
FIGS. 8A and 8B schematically illustrate a screen pop-up display.
Figure 8A:
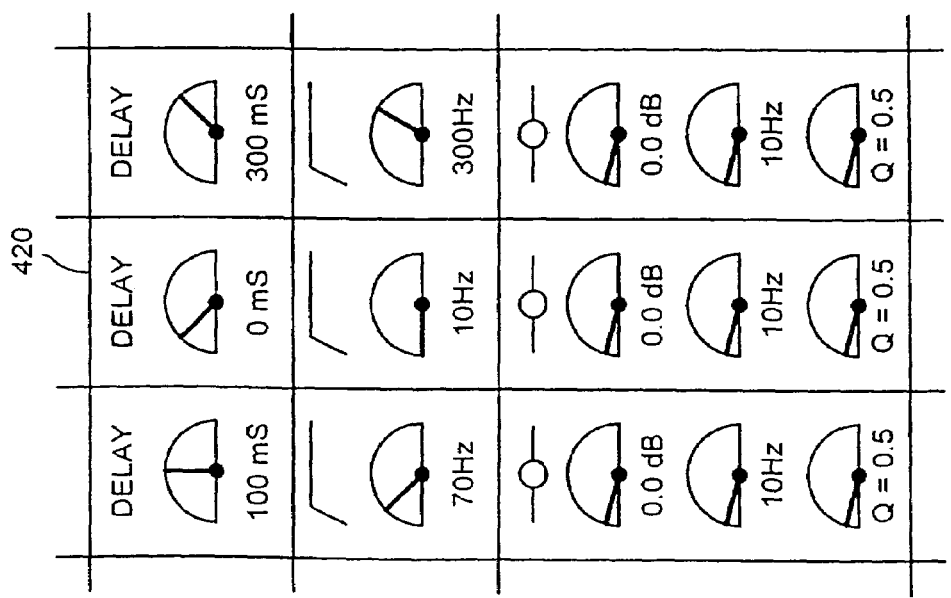

FIGS. 8A and 8B schematically illustrate a so-called screen pop-up display.

FIG. 8A illustrates a part of the display screen illustrated in FIG. 4, in particular a short vertical section of three channel strips. If one of the controls on the channel strips is touched on the screen (which is a touch-sensitive screen), the screen detects the position of the touch. This position is translated by the control computer (using a look-up table—not shown) into the identification of the corresponding control in one of the channel strips. A pup-up display, including that control, is shown and the control can be adjusted using icons on the pop-up display.

For example if the delay control 420 in FIG. 8A is touched, a corresponding "pop-up" display appears and remains displayed until the user selects another control for adjustment or a time delay since the pop-up was touched expires. This is illustrated in FIG. 8B.

The pop-up display includes the icon representing the control which was touched, shown in FIG. 8B as the icon 430, but to clarify that this control is under adjustment the icon is shifted diagonally downwards and to the right by a few (e.g. 1-10) pixels. The pop-up also includes the title of the channel and the channel number 440, together with a fader 450 allowing the value of the particular control to be adjusted.

Two modes of adjustment are available to the user. In a first mode, the user touches the control and keeps his finger on the touch-sensitive screen. Once the pop-up has appeared, a vertical component of movement of the user's finger from the position at which he first touched the screen will cause a corresponding movement of the schematic fader 450 and a corresponding adjustment of the attribute controlled by that control.

In a further mode of operation, the user can touch and release a particular control without moving the finger position between touch and release. The pop-up then appears. The user can then touch the screen within the pop-up and move his finger up or down to adjust the fader 450. If the user touches a non-active area of the pop-up, the pop-up disappears.

Again, adjustment is via a so-called "trim" mode, whereby the adjustment is relative to a current setting of the control, whatever position the user's finger starts at on the screen.

Figure 9:
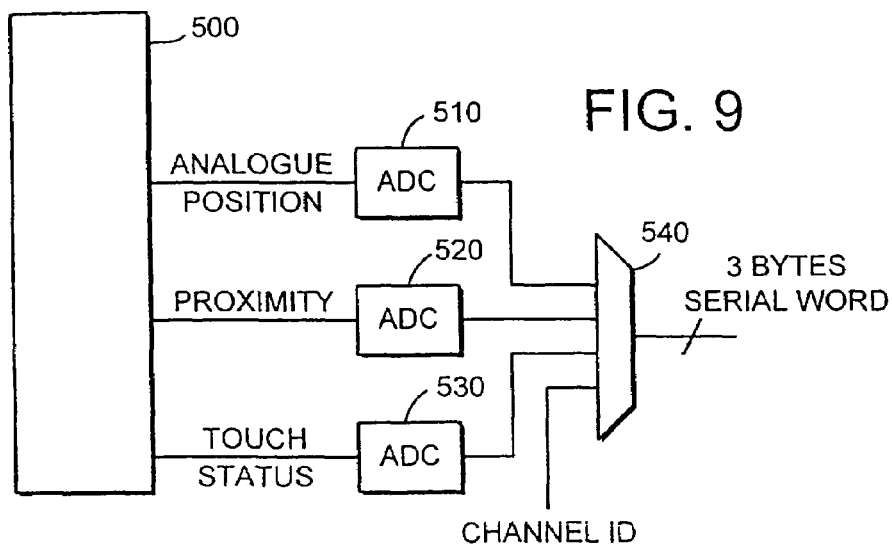
FIGS. 9 and 10 schematically illustrate circuitry within the fader panel of FIG. 5.
Figure 10:
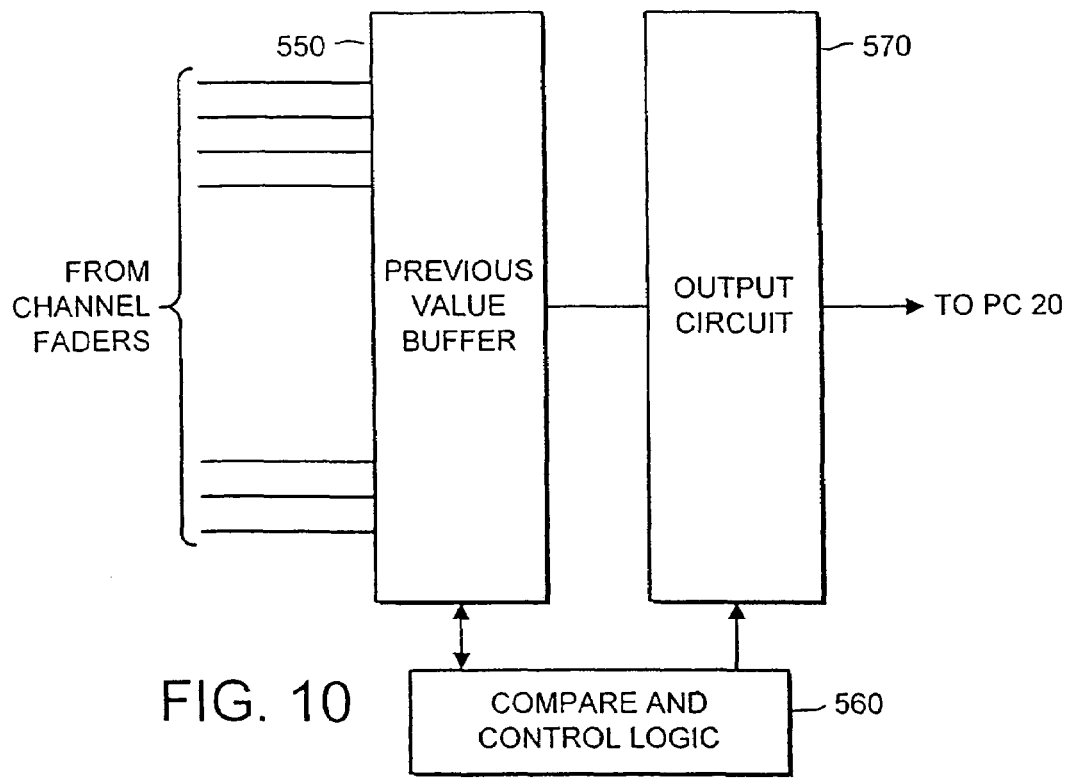

FIGS. 9 and 10 schematically illustrate circuitry within the fader panel 30. In FIG. 9, a particular fader sensor 500 supplies three outputs to respective analogue-to-digital converters 510, 520, 530. These three outputs are: the analogue position at which the fader has been touched (if it has indeed been touched), a proximity signal indicating the proximity of a user's hand to the fader, and a touch status indicating whether or not the fader has been touched.

Digital equivalents of these signals are multiplexed together by a multiplexer 540, with an additional, fixed, signal indicating the identity of the channel to which the fader 500 relates. The multiplexed output of the multiplexer 540 is a three byte serial data word.

All of the these data words from the various channel faders are stored then in a previous value buffer 550 (FIG. 10). Whenever a new serial word is received, it is compared by a compare-and-control logic circuit 560 with the previously buffered value. If a change is detected, the compare-and-control logic 560 causes an output circuit to transmit the three bytes representing the channel which has changed to the control computer 20.

So, a three byte word is transmitted to the control computer 20 only when the status of the fader corresponding to that channel has changed.

Figure 11:
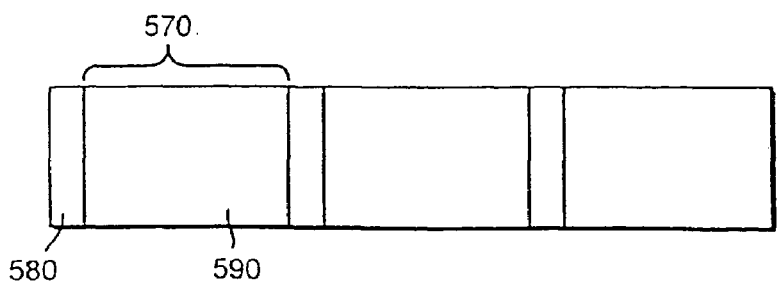
FIG. 11 schematically illustrates the format of a data word transmitted by the fader panel to the control computer.

FIG. 11 schematically illustrates the format of a data word transmitted by the fader panel to the control computer. Each byte 570 of the three byte data word comprises a byte header 580 and a payload 590 carrying information about the channel. The byte header 580 for each byte identifies which of the three bytes in the serial word is represented by the currently transmitted data. This enables the control computer 20 to detect when it has received all three bytes of a data word.

Figures 12, 14:
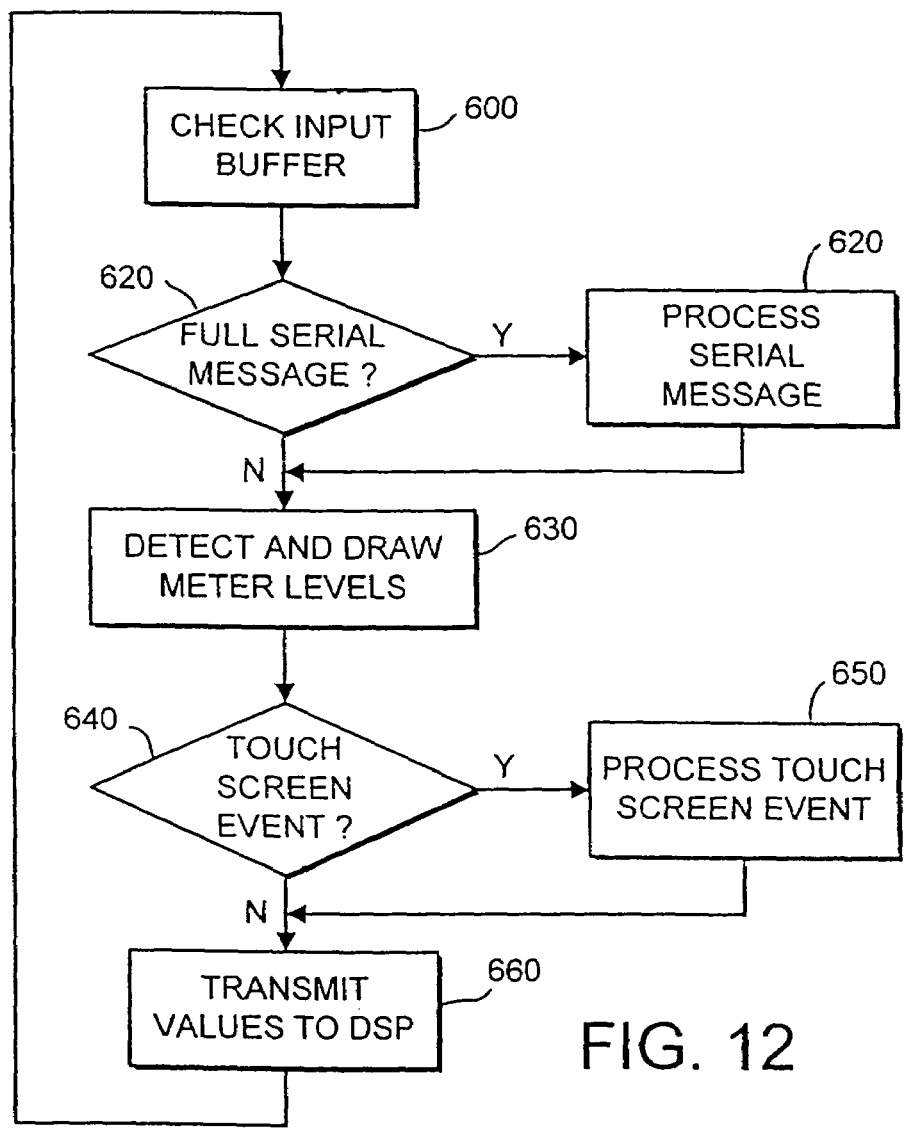
FIG. 12 is a flow chart summarising the operation of the control computer.
FIG. 14 schematically illustrates a colour map.

FIG. 12 is a flow chart summarizing the operation of the control computer 20.

The control computer 20 operates a repetitive loop, which starts with a check of the input buffer 220 (at a step 600). At a step 610, the contents of the input buffer are examined to see whether a full three byte serial word is present. If such a word is present, the serial word is processed at a step 620. The processing associated with step 620 will be described in more detail with reference to FIG. 13 below.

At a step 630, metering information is read from the signal processor 50 and the meters displayed on the display screen are redrawn.

At a step 640, a detection is made as to whether the touch screen has been touched or an existing touch has been removed or changed in position. If such a touch screen event is detected, the touch screen event is processed at a step 650. The processing associated with the step 650 will be described in more detail below with reference to FIG. 15.

Finally, if any attributes associated with signal processing operations have changed throughout the operation of the loop, the new values are transmitted to the digital signal processor 50.

Figure 13:
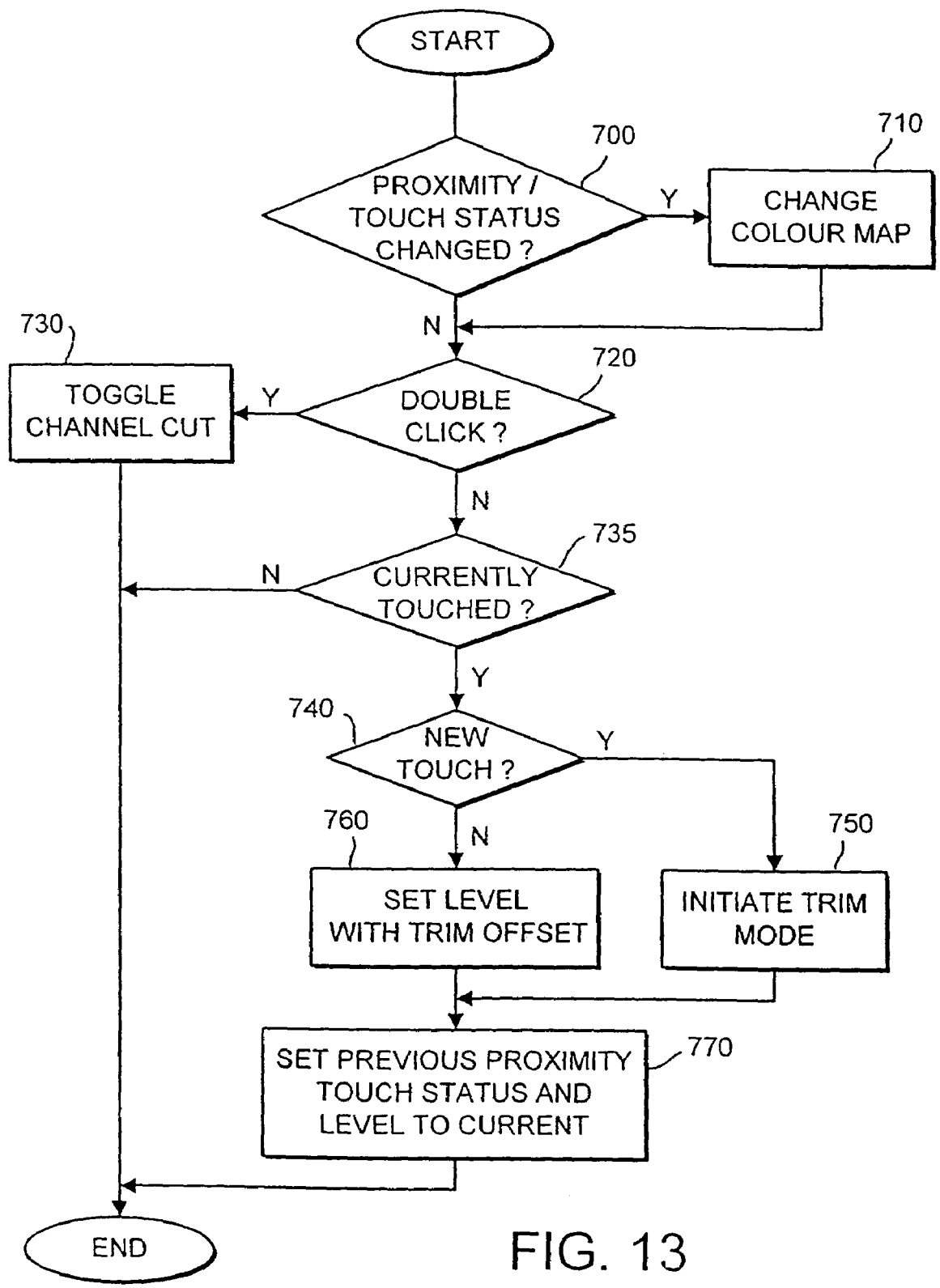
FIG. 13 is a flow chart illustrating the processing of a serial message.

FIG. 13 is a flow chart illustrating the processing of a serial message.

At a step 700, a detection is made as to whether the proximity or touch status of a channel has changed, i.e. is the channel touched where it was not touched before or has the proximity value changed. If the answer is yes, the colour map associated with particular areas of the fader corresponding to that channel is changed at a step 710. This process will be described in more detail with reference to FIG. 14.

At a step 720, a detection is made as to whether a double click action has taken place. In other words, has the touch panel been touched, released, touched and released within a predetermined period. If such an event is detected, a channel cut control is toggled at a step 730 and the process ends. The channel cut control switches on or off the output of that channel. By toggling the control, if the control is currently off it toggles on, and vice versa.

If a double click event is not detected, a detection is made at a step 735 as to whether the panel is currently touched. If the answer is yes, a further detection is made 740 as to whether the touch is a new touch. This detection is made by examining a stored touch attribute from a previous operation of this flow chart.

If this is a new touch, a so-called trim mode is initiated at a step 750. This involves storing the position along the fader at which the new touch has been made and mapping it to the current value of the gain parameter controlled by that fader. Thus, when (in subsequent operations of this flow chart) the user's hand might be moved up or down the fader, adjustment is made from the current gain attribute controlled by the fader. If this is not a new touch, then at a step 760 an adjustment might have to be made to the gain attribute controlled by the fader, if the user's finger has moved up or down the fader since the last operation of the flow chart.

Finally, the stored previous proximity touch status and level attributes are set to those detected during the current operation of the flow chart at a step 770.

FIG. 14 schematically illustrates a colour map.

The colour map provides a mapping between so-called logical colours (indexed from 0 to 255) and values of red, green and blue for actual display on the screen. So, for example, the logical colour 1 is mapped to 60R, 60G, 60B for display.

The R,G and B values are each adjustable between 0 and 255 (i.e. 8 bits) so the colour map defines a subset of 256 of the 16.7 million combinations of R, G and B values.

The control computer maintains two copies of the colour map. A first copy, the so-called "BIOS" copy, is alterable by the control computer under program control. Alterations can then be copied across into the video card colour map which is actually used to map logical colours onto display parameters for the display screen.

In the present embodiment, areas of the screen such as each of the channel faders are assigned a different logical colour, even though the R, G and B values specified by those logical colours may all be initially the same. When the display colour of an area is to be changed rapidly, for example when the touch or proximity status of a fader changes, then instead of redrawing the area using a standard but (in this context) relatively slow Microsoft Windows redraw command, a simple change is made to the colour map entry for the logical colour used for that particular area of the screen. This has almost instant effect on the actual displayed colour.

As described above, the change is made first to the BIOS colour map and then the change is propagated (using a standard command) to the video card colour map.

Figure 15:
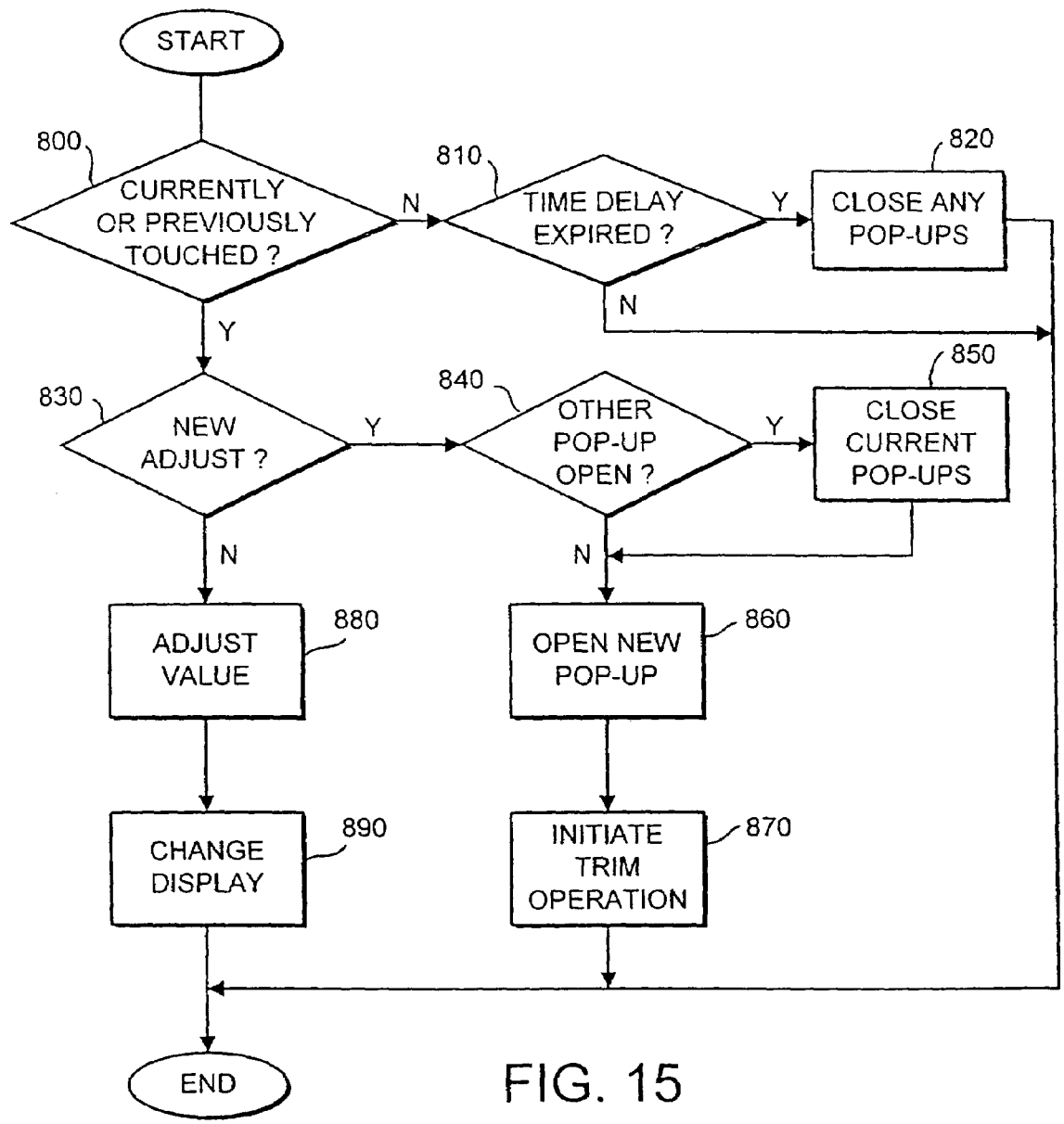
FIG. 15 is a flow chart illustrating processing of a touch screen event.

FIG. 15 illustrates the processing relating to step 650 of FIG. 12, namely the processing of a touch screen event.

At a step 800, a check is made as to whether the screen is currently or previously (i.e. at the last operation of the flowchart) touched. If the answer is yes, then processing proceeds to step 830. If the answer is no, then a check is made at a step 810 as to whether a time delay has expired since the screen was last touched. If not, the process ends. If so, then any open pop-ups are closed at a step 820 and the process ends.

At step 830 a check is made as to whether the current touch represents a new adjustment. If so, processing proceeds to steps 840 and 850 where any existing pop-ups are closed. At a step 860 a new pop-up for the new adjustment is opened, and at a step 870 a trim operation is initiated by mapping the current setting of the selected control to the current finger position, so that adjustments are made in a relative, rather than an absolute, manner as described above. The process then ends.

If this is an existing adjustment, i.e. if the finger has not left the screen since the trim mode was set up (on a previous operation of the flow chart) then at a step 880 the current value of the control is altered (if the finger has moved) and the corresponding display within the pop-up is altered at a step 890.

In further embodiments of the invention, a detection (not shown) can be made of the average proximity value over those sensors detecting the proximity of a user's hand. The sensitivity of the proximity measurement can be adjusted as a result of this detection. For example, if the average value is that of a very weak detection (suggesting that the user's hand is far away) then the sensitivity can be increased.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus comprising:
   a touch-sensitive display screen for displaying a set of screen icons associated respectively with an array of user-operable controls, said array of user-operable controls being adjustable by movement of a user's hand on the touch-sensitive display screen while touching one of said controls,
   wherein a particular position of a user's hand on one of said controls adjusts a gain value relative to current levels and irrespective of the start position of the user's hand on the touch-sensitive display screen;
   a detector for detecting when the user's hand is touching one of said controls; and
   a display processor, responsive to a detection, such that when said user's hand touches one of said controls, said screen icon associated with said control is enlarged and highlighted on said touch-sensitive display screen, thereby facilitating the user's operation of said array of controls,
   wherein when a pop-up icon, representing a control that was touched, is shifted diagonally downwards and to the right, by between 1 and 10 pixels, on the display screen, thereby indicating that the control is under adjustment, and
   wherein particular areas are colored in different shades according to degrees of proximity of the user's hand to these particular areas.

2. The apparatus according to claim 1, wherein said apparatus is an audio processing apparatus and said array of controls relates at least in part to a control of audio processing parameters.

3. The apparatus according to claim 2, in which said screen icon relating to a control displays, at least an audio processing parameter associated with said control.

4. The apparatus according to claim 1, in which said display processor is operable to change a display color of at least a part of said icon associated with said one of said controls.

* * * * *